United States Patent
Park et al.

(10) Patent No.: US 11,310,430 B2
(45) Date of Patent: Apr. 19, 2022

(54) METHOD AND APPARATUS FOR PROVIDING VIDEO IN PORTABLE TERMINAL

(71) Applicant: UBIFUNSTUDIO CO., LTD., Seoul (KR)

(72) Inventors: Jin Hwan Park, Seoul (KR); Ji Sung Kim, Seoul (KR)

(73) Assignee: UBIFUNSTUDIO CO., LTD., Seoul (KR)

( * ) Notice: Subject to any disclaimer, the term of this patent is extended or adjusted under 35 U.S.C. 154(b) by 0 days.

(21) Appl. No.: 16/978,761

(22) PCT Filed: Apr. 22, 2019

(86) PCT No.: PCT/KR2019/004814
§ 371 (c)(1),
(2) Date: Sep. 7, 2020

(87) PCT Pub. No.: WO2019/216572
PCT Pub. Date: Nov. 14, 2019

(65) Prior Publication Data
US 2021/0051276 A1    Feb. 18, 2021

(30) Foreign Application Priority Data
May 11, 2018   (KR) .......................... 10-2018-0054472

(51) Int. Cl.
*H04N 5/232*   (2006.01)
*H04M 1/72469*   (2021.01)
*H04M 1/72448*   (2021.01)

(52) U.S. Cl.
CPC .. *H04N 5/232935* (2018.08); *H04M 1/72448* (2021.01); *H04M 1/72469* (2021.01); *H04N 5/23296* (2013.01); *H04N 5/232945* (2018.08)

(58) Field of Classification Search
CPC ...... H04N 5/23293; H04N 1/393; G06T 3/40; G06F 3/0481; G06F 17/30; G06F 3/0488
(Continued)

(56) References Cited

U.S. PATENT DOCUMENTS

| | | | |
|---|---|---|---|
| 9,866,314 B2* | 1/2018 | Lee | ......................... H04L 7/0075 |
| 2004/0229611 A1* | 11/2004 | Chun | ..................... G06F 16/951 |
| | | | 455/434 |

(Continued)

FOREIGN PATENT DOCUMENTS

| | | |
|---|---|---|
| KR | 10-2011-0002630 A | 1/2011 |
| KR | 10-2014-0089149 A | 7/2014 |

(Continued)

OTHER PUBLICATIONS

International Search Report in International Application No. PCT/KR2019/004814, dated Jul. 26, 2019, 2 pages.

*Primary Examiner* — Xi Wang
(74) *Attorney, Agent, or Firm* — Park, Kim & Suh, LLC

(57) ABSTRACT

A method of providing a video in a portable terminal according to the present invention may include: monitoring whether an execution request event for a multi-camera mode of a portable terminal is generated; when the execution request event is generated, executing a virtual multi-preview menu including a plurality of pre-view regions, which is divided into independent separate regions and displays a plurality of different contents, respectively, and when the virtual multi-preview menu is executed, photographing a multi-preview image, so that different contents are displayed on the plurality of preview regions, respectively, with a virtual camera implemented in the portable terminal.

9 Claims, 3 Drawing Sheets

(58) Field of Classification Search
USPC .................................................. 348/333.11
See application file for complete search history.

(56) References Cited

U.S. PATENT DOCUMENTS

| | | | |
|---|---|---|---|
| 2007/0053668 A1* | 3/2007 | Misawa | H04N 1/00453 |
| | | | 386/225 |
| 2011/0001838 A1 | 1/2011 | Lee | |
| 2014/0118600 A1* | 5/2014 | Son | H04N 5/23218 |
| | | | 348/333.11 |
| 2014/0192232 A1* | 7/2014 | Park | H04N 5/232945 |
| | | | 348/231.99 |
| 2014/0192245 A1 | 7/2014 | Lee et al. | |
| 2015/0271467 A1* | 9/2015 | Weinstock | H04N 13/282 |
| | | | 348/46 |
| 2017/0034443 A1* | 2/2017 | Kwon | G06F 16/58 |
| 2018/0069983 A1* | 3/2018 | Cho | H04M 1/72469 |
| 2019/0387171 A1* | 12/2019 | Juang | H04N 5/232 |

FOREIGN PATENT DOCUMENTS

| | | |
|---|---|---|
| KR | 10-2014-0089866 A | 7/2014 |
| KR | 10-2015-0078752 A | 7/2015 |
| KR | 10-2015-0129077 A | 11/2015 |

\* cited by examiner

METHOD AND APPARATUS FOR PROVIDING VIDEO IN PORTABLE TERMINAL

CROSS-REFERENCE TO RELATED APPLICATIONS

This application is the National Stage filing under 35 U.S.C. 371 of International Application No. PCT/KR2019/004814, filed on Apr. 22, 2019, which claims the benefit of Korean Patent Application No. 10-2018-0054472, filed on May 11, 2018, the contents of which are all hereby incorporated by reference herein in their entirety.

TECHNICAL FIELD

The present invention relates to a technique for providing a video in a portable terminal, and more particularly, to a method and an apparatus for providing a video in a portable terminal, which display the plurality of different contents in independent separate regions, respectively, through a virtual preview service and photograph the plurality of contents with one multi-preview image.

BACKGROUND ART

In general, a portable terminal (or a communication terminal), such as a portable phone, a smart phone, a smart pad, a smart book, a tablet PC, and a netbook computer, having a call and wireless data communication function, is equipped with a camera.

Particularly, a communication terminal, such as a portable phone and a smart phone, is generally equipped with a front camera and a rear camera.

Accordingly, users of the portable terminals may photograph a desired video or still image by operating the front camera or the rear camera.

In this case, in a video providing method in the existing arts, an entire display panel is provided as one preview, and the users may photograph (generate) desired video or still image contents while viewing previews selectively connected with the front cameras or the rear cameras.

However, the video providing method in the existing arts provides the preview connected with only one camera, so that there is a problem in that there is a limit to satisfy various service needs of users.

For example, there may be a specialized service need to simultaneously view a preview connected with the front camera, a preview connected with the rear camera, and a preview of video contents stored in a memory of the portable terminal, but in the video providing method in the existing arts, there is a problem of not satisfying the specialized service need.

DISCLOSURE

Technical Problem

The present invention suggests a method and an apparatus for providing a video in a portable terminal which displays the plurality of different contents on independent separate regions, respectively, through a virtual preview service, and enables a user to photograph the plurality of different contents with one multi-preview image.

The technical problem of the present invention is not limited to the foregoing, and those skilled in the art will clearly understand other non-mentioned technical problems through the description below.

Technical Solution

In accordance with another aspect, the present invention provides a method of providing a video in a portable terminal, the method including: monitoring whether an execution request event for a multi-camera mode of a portable terminal is generated; when the execution request event is generated, executing a virtual multi-preview menu including a plurality of pre-view regions, which is divided into independent separate regions and displays a plurality of different contents, respectively, and when the virtual multi-preview menu is executed, photographing a multi-preview image, so that the different contents are displayed on the plurality of preview regions, respectively, with a virtual camera implemented in the portable terminal.

Each operation for photographing the multi-preview image may be executed through an image providing application or a camera application mounted on the portable terminal.

The method may further include, when the virtual multi-preview menu is executed, transmitting multi-content data generated by matching an audio signal input from the outside and the multi-preview image to an additional service server or another portable terminal through a network in real time.

The method may further include, when the virtual multi-preview menu is executed, recording multi-content data generated by matching an audio signal input from the outside and the multi-preview image in a memory of the portable terminal.

Each contents displayed on each preview region may include a front image content photographed through a front camera of the portable terminal and a rear image content photographed through a rear camera of the portable terminal.

Each contents displayed in each preview region may further include any one or more of a video content stored in the portable terminal, a still image content, and an animation content.

Each preview region may be added to or deleted from the virtual multi-preview menu based on a region addition event or a region deletion event.

The content displayed on each preview region may be individually rotated in any one direction among upper, lower, left, and right directions and a diagonal direction based on an inclination event of the portable terminal.

Each preview region may be individually zoomed in or zoomed out based on a zoom-in request event or a zoom-out request event.

The virtual camera may be a three-dimensional (3D) camera which photographs a 3D display of the multi-preview image.

In accordance with another aspect, the present invention provides a computer readable recording medium stored in a computer program to cause a processor to perform a method of providing a video in a portable terminal, the method including: monitoring whether an execution request event for a multi-camera mode of a portable terminal is generated; when the execution request event is generated, executing a virtual multi-preview menu including a plurality of pre-view regions, which is divided into independent separate regions and displays a plurality of different contents, respectively, and when the virtual multi-preview menu is executed, photographing a multi-preview image, so that the different contents are displayed on the plurality of preview regions, respectively, with a virtual camera implemented in the portable terminal.

In accordance with another aspect, the present invention provides a computer program stored in a computer readable recording medium to cause a processor to perform a method of providing a video in a portable terminal, the method including: monitoring whether an execution request event for a multi-camera mode of a portable terminal is generated; when the execution request event is generated, executing a virtual multi-preview menu including a plurality of pre-view regions, which is divided into independent separate regions and displays a plurality of different contents, respectively, and when the virtual multi-preview menu is executed, photographing a multi-preview image, so that the different contents are displayed on the plurality of preview regions, respectively, with a virtual camera implemented in the portable terminal.

In accordance with another aspect, the present invention provides an apparatus for providing a video in a portable terminal, the apparatus including: an event detecting unit configured to monitor whether an execution request event for a multi-camera mode of a portable terminal is generated; a camera controlling unit configured to activate a front camera and a rear camera when the execution request event is generated; a preview menu executing unit configured to execute a virtual multi-preview menu including a plurality of preview regions, which is divided into independent separate regions and displays a front image content provided from the front camera and a rear image content provided from a rear camera, respectively, and a multi-image obtaining unit configured to photograph a multi-preview image, so that the front image content and the rear image content are displayed on the plurality of preview regions, respectively, by using a virtual camera implemented in the portable terminal when the virtual multi-preview menu is executed.

The apparatus may further include a content generating unit configured to generate multi-content data by matching an audio signal input from the outside and the multi-preview image when the virtual multi-preview menu is executed, and transmit the generated multi-content data to an additional service server or another portable terminal through a data transmitting and receiving unit in real time.

The apparatus may further include a content generating unit configured to generate multi-content data by matching an audio signal input from the outside and the multi-preview image when the virtual multi-preview menu is executed, and record the generated multi-content data in a memory of the portable terminal.

The plurality of preview regions may further include another preview region displaying one or more of a video content, a still image content, and an animation content stored in a memory of the portable terminal.

The apparatus may further include a preview region managing unit configured to add or delete a preview region to or from the virtual multi-preview menu based on a region addition event or a region deletion event.

The apparatus may further include a preview region switching unit configured to individually rotate the content displayed in each preview region in any one direction among upper, lower, left, and right directions and a diagonal direction based on an inclination event of the portable terminal.

The apparatus may further include a zoom executing unit configured to individually zoom in or zoom out each preview region based on a zoom-in request event or a zoom-out request event.

The virtual camera may be a three-dimensional (3D) camera which photographs a 3D display of the multi-preview image.

Advantageous Effects

According to the exemplary embodiment of the present invention, the plurality of different contents is displayed in independent separate regions, respectively, through a virtual preview service and are photographed with one multi-preview image to be stored in a portable terminal or provided to another terminal or a server, thereby effectively satisfying various service demands of users.

MODE FOR CARRYING OUT THE INVENTION

The advantages and characteristics of the present invention, and a method for achieving the advantages and characteristics will become clear by referring to the exemplary embodiment, which is described in detail, together with the accompanying drawings. Herein, the present invention is not limited to exemplary embodiments disclosed herein, but will be implemented in various forms, and the exemplary embodiments are provided so that the present invention is completely disclosed, and a person of ordinary skilled in the art can fully understand the scope of the present invention, and the present invention will be defined only by the scope of the appended claims.

In the following description of the present invention, a detailed description of known functions and configurations incorporated herein is omitted to avoid making the subject matter of the present invention unclear. In addition, the terminology used in the description is defined in consideration of the function of corresponding components used in the present invention and may be varied according to users, operator's intention, or practices. Accordingly, the definition must be interpreted based on the overall content disclosed in the description.

Hereinafter, an exemplary embodiment of the present invention will be described in detail with reference to the accompanying drawings.

Figure 1:
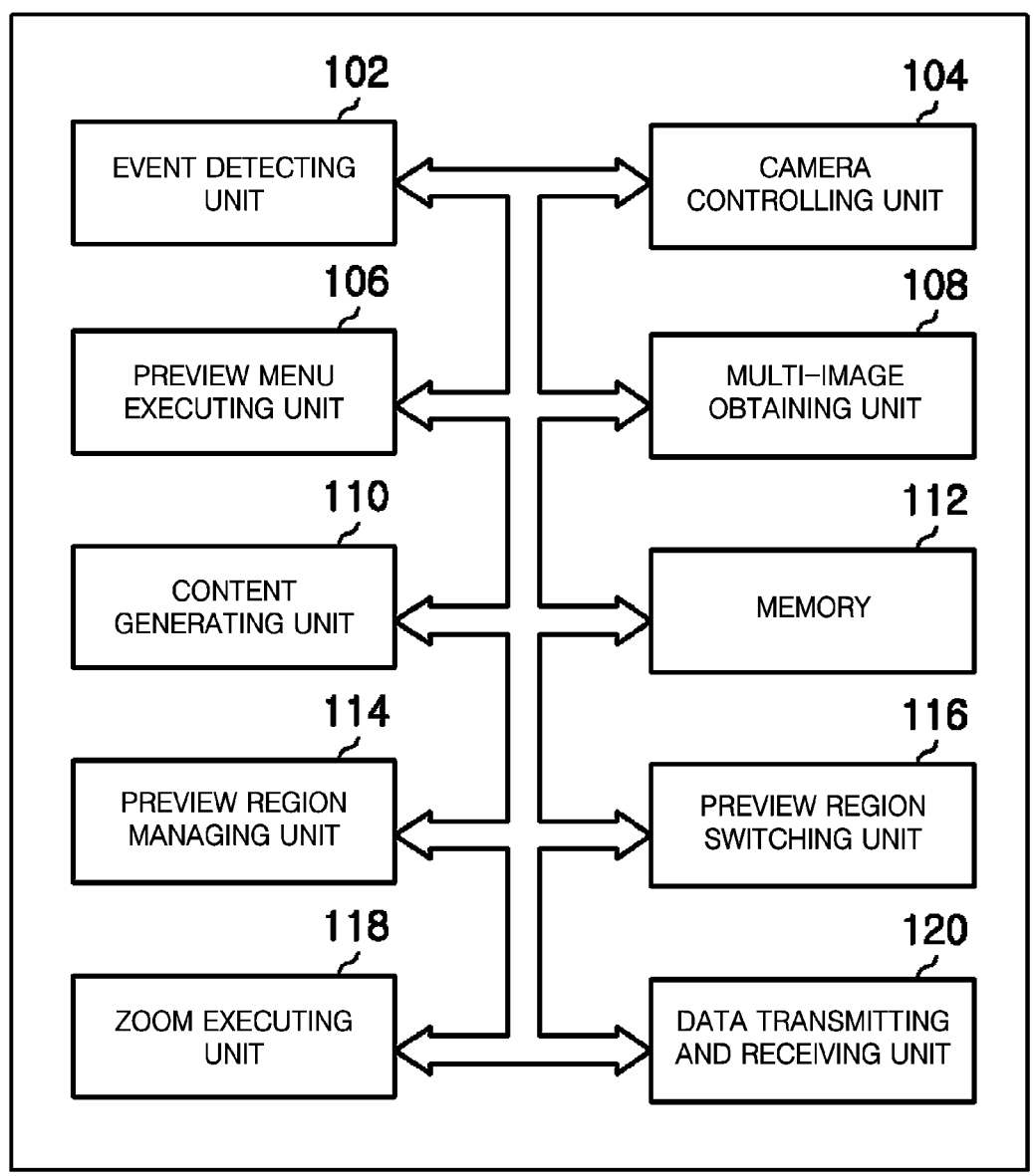
FIG. 1 is a block diagram for an apparatus for providing a video in a portable terminal according to an exemplary embodiment of the present invention.

FIG. 1 is a block diagram illustrating an apparatus 100 for providing a video in a portable terminal according to an exemplary embodiment of the present invention.

Herein, the portable terminal may refer to a wireless communication terminal including a photographing means, a display means, and a communication means, such as a smart phone or a smart pad, but is not limited thereto. Further, the apparatus 100 for providing a video may be included or installed in the portable terminal.

Referring to FIG. 1, the apparatus 100 for providing a video in the portable terminal according to the present exemplary embodiment may include an event detecting unit 102, a camera controlling unit 104, a preview menu executing unit 106, a multi-image obtaining unit 108, a content generating unit 110, a memory 112, a preview region managing unit 114, a preview region switching unit 116, a zoom executing unit 118, a data transmitting and receiving unit 120, and the like.

First, the event detecting unit 102 may provide a function of monitoring an execution request event for a multi-camera mode of the portable terminal, that is whether an execution request event by a touch interface of a user is generated, and notifying the camera controlling unit 104 and the preview menu executing unit 106 of the execution request event when the execution request event is generated.

Figure 3:
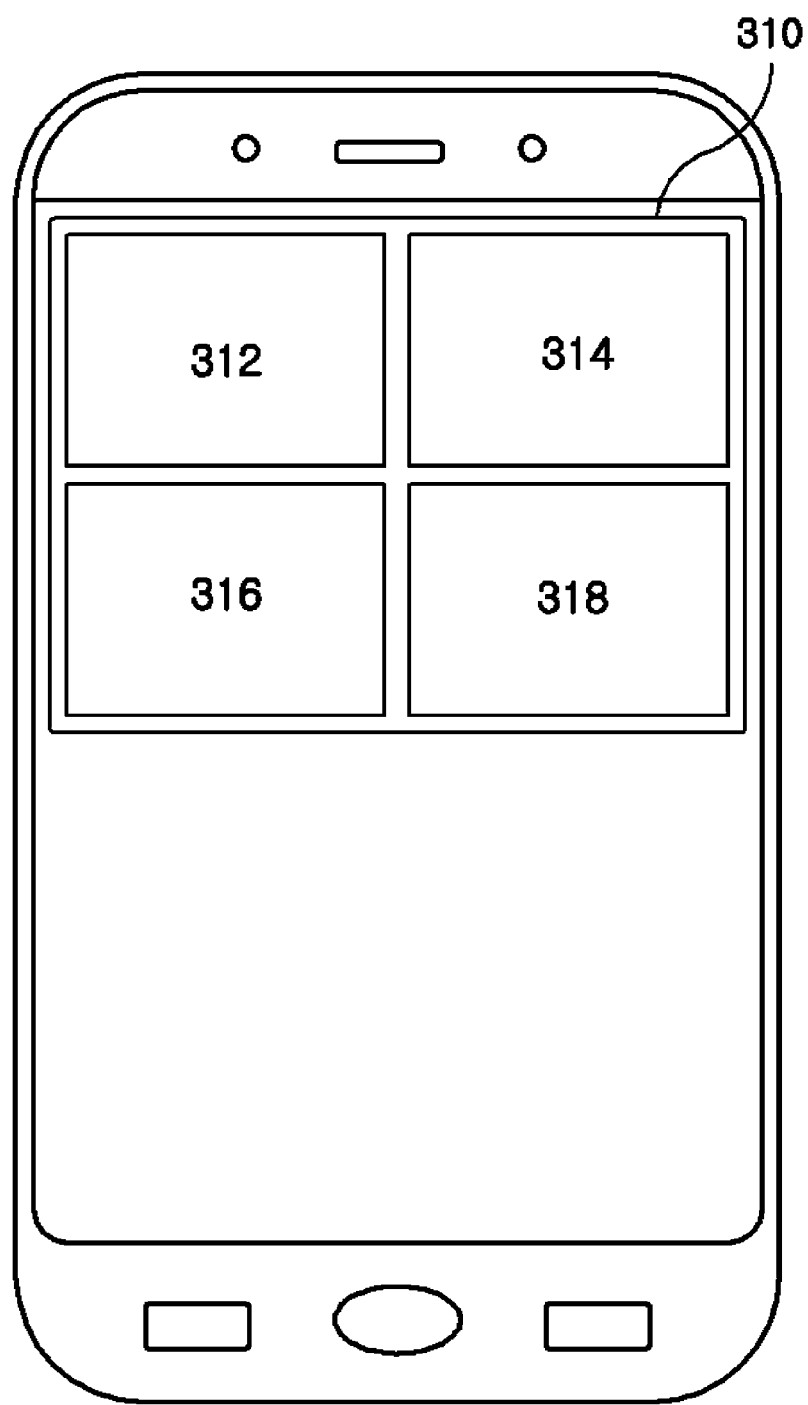
FIG. 3 is a diagram illustrating an example of a screen in which a virtual multi-preview menu is executed in a display unit of the portable terminal according to the exemplary embodiment of the present invention.

Herein, the multi-camera mode may mean, for example, a mode in which a virtual multi-preview menu 310 including the plurality of preview regions 312, 314, 316 and 318, which is divided into independent separate regions and displays the plurality of different contents (for example, 3D contents), respectively, is executed as illustrated in FIG. 3.

In FIG. 3, the first preview region 312 may be, for example, the region on which a front image content (a video content or a still image content) provided from a front camera (not illustrated) of the portable terminal is displayed, the second preview region 314 may be, for example, the region on which a rear image content (a video content or a still image content) provided from a rear camera (not illustrated) of the portable terminal is displayed, the third preview region 316 may be, for example, the region on which a video content or a still image content stored in the memory 112 of the portable terminal is displayed, and the fourth preview region 318 may be, for example, the region on which an animation content and the like stored in the memory 112 of the portable terminal is displayed.

Herein, each of the preview regions 312, 314, 316 and 318 may be added to or deleted from the virtual multi-preview menu according to a region addition event or a region deletion event generated according to the touch interface of the user. That is, the number of preview regions configuring the virtual multi-preview menu 310 may be arbitrarily adjusted according to a selection of the user of the portable terminal.

Further, the content or the 3D content displayed on each preview region configuring the virtual multi-preview menu 310 may be displayed to be individually rotated in any one direction of up, down, left, and right directions or a diagonal direction based on an inclination event of the portable terminal.

Further, the content or the 3D content displayed on each preview region configuring the virtual multi-preview menu 310 may be displayed, for example, to be individually zoomed-in or zoomed-out based on a zoom-in request event or a zoom-out request event generable by using a finger.

In addition, when at least one of the contents displayed on each preview region configuring the virtual multi-preview menu 310 is a video, each part being played in the video may be controlled by a user interface provided in the portable terminal.

Next, when the generation of the execution request event for the multi-camera mode is notified to the camera controlling unit 104 from the event detecting unit 102, the camera controlling unit 104 may provide a function of simultaneously activating (operating) the front camera and the rear camera which are not illustrated) and the like.

Herein, the front image content (video or still image content) obtained through the front camera may be displayed on the first preview region 312 within the virtual multi-preview menu 310, and the rear image content (video or still image content) obtained through the rear camera may be displayed on the second preview region 314 within the virtual multi-preview menu 310.

Further, the preview menu executing unit 106 may provide a function of displaying (3D displaying) the virtual multi-preview menu 310 which is divided into independent separate regions to include a plurality of preview regions on which the front image content and the rear image content provided from the front camera and the rear camera and the like are displayed, respectively, in a display unit of the portable terminal and the like.

For example, as illustrated in FIG. 3, when it is assumed that the virtual multi-preview menu 310 consists of four physically separated preview regions 312, 314, 316, and 318, the preview menu executing unit 106 may display the front image content (video or still image content) obtained from the front camera through the first preview region 312, the rear image content (video or still image content) obtained from the rear camera through the second preview region 314, the video content or a still image content stored in the memory 112 through the third preview region 316, and the animation content stored in the memory 112 through the fourth preview region 318.

Further, when the virtual multi-preview menu is executed through the preview menu executing unit 106, the multi-image obtaining unit 108 may provide a function of photographing the multi-preview image, so that the front image content, the rear image content, and the like are displayed on the preview regions, respectively, with a virtual camera and transmitting the photographed multi-preview image to the content generating unit 110. Herein, the virtual camera may be, for example, a virtual 3D camera implemented in the portable terminal.

Next, the content generating unit 110 may provide a function of generating multi-content data by matching a multi-preview image transmitted from the multi-image obtaining unit 108 and an audio signal input from the outside through a microphone (not illustrated) of the portable terminal and the like. Herein, the generated multi-content data may be stored (recorded) in the memory 112 or transmitted to the data transmitting and receiving unit 120 in real time.

In the meantime, the users of the portable terminal may newly add or delete a preview region to the virtual multi-preview menu 310 through the user interface, and when a region addition event or a region deletion event is detected through the event detecting unit 102, the preview region managing unit 114 may provide a function of adding a new preview region to the virtual multi-preview menu 310 or deleting the previously generated preview region and the like.

Further, the users of the portable terminal may change a point being played in the video on the preview region of the virtual multi-preview menu 310 by using the user interface.

Further, when the inclination event (inclination events in the upper, lower, left, and right directions) of the portable terminal is detected through the event detecting unit 102, the preview region switching unit 116 may provide a function of rotating the content displayed on each preview region in any one direction among the upper, lower, left, and right directions and a diagonal direction, and the like.

Further, for example, when the zoom-in request event or the zoom-out request event generable by using fingers is detected, the zoom executing unit 118 may provide a variable display functions of zooming on the corresponding preview region (decreasing the display region) or zooming out the corresponding preview region (enlarging the display region) and the like.

Further, the data transmitting and receiving unit 120 may include a transmitting and receiving antenna and the like for communicating with an external server or another portable terminal, and may provide a function of transmitting the multi-content data which is generated from the content generating unit 110, when the virtual multi-preview menu is executed and is transmitted, that is, the multi-content data including a multi-preview image and an external audio signal, to an external additional service server or another portable terminal through a network in real time, and the like.

In the meantime, according to the exemplary embodiment of the present invention, the series of operations of photographing the multi-preview image and generating the multi-content data may be implemented through an image providing application or a camera application mounted in the portable terminal.

Next, the series of processes for executing the virtual multi-preview menu in the display unit of the portable terminal by using the apparatus for providing the video of the present exemplary embodiment including the foregoing configuration will be described in detail.

Figure 2:
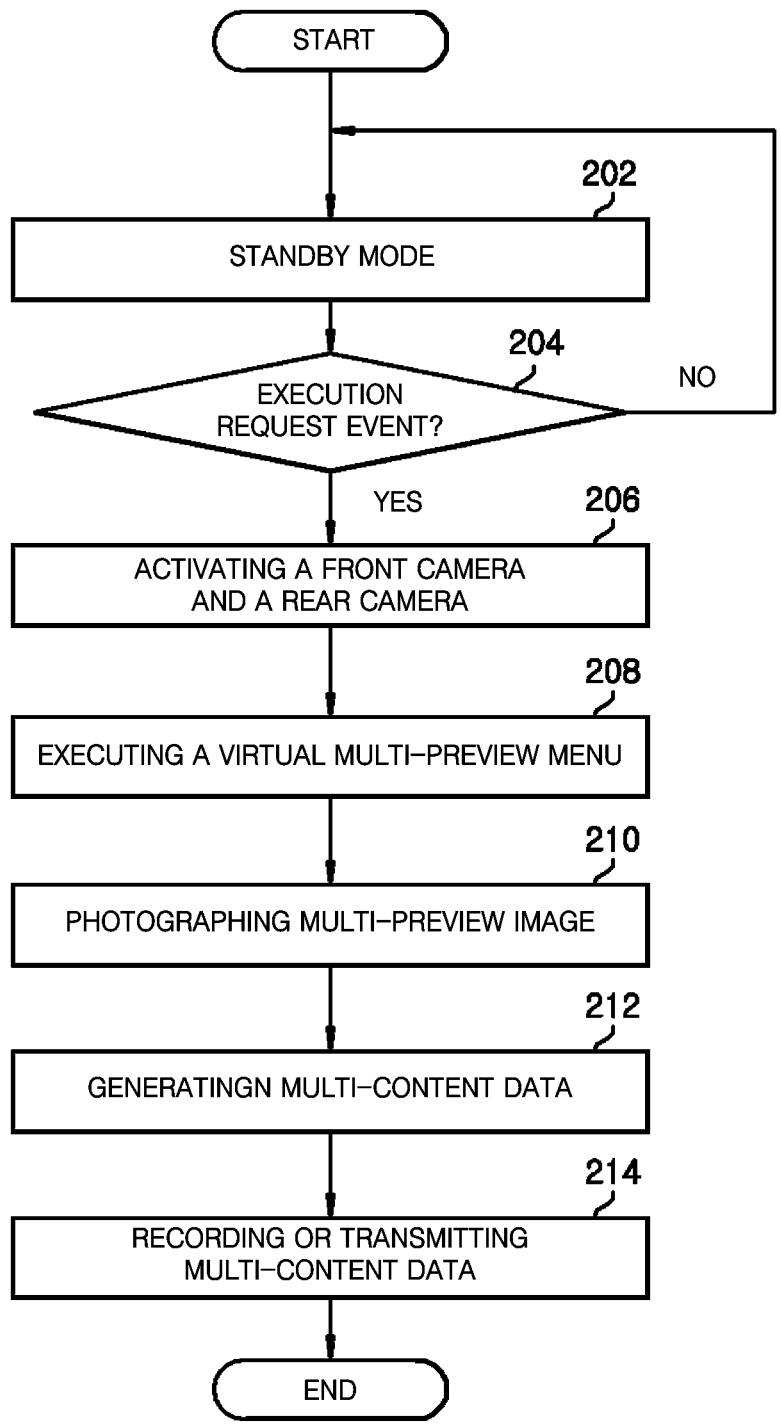
FIG. 2 is a flowchart illustrating a main process of serving a multi-preview image, so that the plurality of different contents are displayed on separate regions, respectively, based on a virtual preview service according to the exemplary embodiment of the present invention.

FIG. 2 is a flowchart illustrating a main process of serving a multi-preview image to display the plurality of different contents on the separate regions, respectively, based on a virtual preview service according to the exemplary embodiment of the present invention.

Referring to FIG. 2, when the portable terminal performs a standby mode (operation 202), the event detecting unit 102 monitors whether an execution request event for the multi-camera mode of the portable terminal is generated through the user interface (operation S204).

As the result of the monitoring of operation 204, when it is determined that the execution request event is generated, the camera controlling unit 104 activates (operates) the front camera and the rear camera (operation 206), and herein, a front image content obtained through the front camera and a rear image content obtained through the rear camera may be displayed on the first preview region 312 and the second preview region 314 within the virtual multi-preview menu 310, respectively.

Further, the preview menu executing unit 106 executes the virtual multi-preview menu 310 including the four preview regions 312, 314, 316 and 318, that is, displays the virtual multi-preview menu 310 in the display unit of the portable terminal (operation 208).

For example, the front image content obtained from the front camera may be displayed on the first preview region 312, the rear image content obtained from the rear camera may be displayed on the second preview region 314, a video content or still image content drawn from the memory 112 may be displayed on the third preview region 316, and an animation content drawn from the memory 112 may be displayed on the fourth preview region 318.

In this case, a service of adding or deleting the preview region through the user interface may be provided to a user of the portable terminal when the virtual multi-preview menu 310 is being executed.

Further, the user of the portable terminal may display the content on each preview region to be individually rotated in any one direction among the upper, lower, left, and right directions and the diagonal direction through an inclination event of the portable terminal when the virtual multi-preview menu 310 is being executed.

Further, when the virtual multi-preview menu 310 is being executed, the user of the portable terminal may, for example, variably display each preview region by separately zooming in or zooming out each preview region through the zoom-in request event or the zoom-out request event generable by using a finger.

Further, the users of the portable terminal may change the point being played in the video on the preview region of the virtual multi-preview menu 310 by using the user interface.

Next, when the virtual multi-preview menu is executed, the multi-image obtaining unit 108 may photograph the multi-preview image, so that the content is displayed on each preview region, by using the virtual camera (for example, the 3D virtual camera) and provide the photographed multi-preview image to the content generating unit 110 (S210).

Then, the content generating unit 110 matches the multi-preview image transmitted from the multi-image obtaining unit 108 and an audio signal input from the outside through a microphone (not illustrated) of the portable terminal to generate multi-content data (S212).

Herein, the generated multi-content data may be stored (recorded) in the memory 112 of the portable terminal or may be transmitted to an external additional service server or another portable terminal through the data transmitting and receiving unit 120.

In the meantime, each block of the accompanying block diagram and the combinations of the respective operations of the flowchart may also be performed by computer program instructions. The computer program instructions may be mounted on a processor of a general purpose computer, a special purpose computer, or other programmable data processing equipment, so that the instructions performed through the processor of the computer or other programmable data processing equipment generate means performing the functions described in the respective blocks of the block diagram or the respective operations of the flowchart.

The computer program instructions may also be stored in a computer usable or computer readable recording medium oriented to a computer or other programmable data processing equipment for implementing a function in a specific way, so that the instructions stored in the computer usable or computer readable recording medium may also produce a manufactured item including the instruction means performing the function described in each block of the block diagram or each operation of the flowchart.

Further, the computer program instructions may also be mounted on the computer or other programmable data processing equipment, so that a series of operation steps is performed in the computer or other programmable data processing equipment to generate a process executed by the computer and the instructions performed by the computer or other programmable data processing equipment may also provide the operations for executing the functions described in the respective blocks of the block diagram and the respective operations of the flowchart.

Further, each block or each operation may represent a part of a module, a segment, or a code including one or more instructions for executing a specific logical function(s). Further, it should be noted that in several alternative exemplary embodiments, the functions mentioned in the blocks or operations are generated in a different order. For example, it is also possible that two blocks or operations shown in succession are actually performed substantially simultaneously, or the blocks or operations are sometimes performed in a reverse order depending on the corresponding function.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment.

The scope of the present invention shall be construed on the basis of the accompanying claims in such a manner that all of the technical ideas included within the scope equivalent to the claims belong to the present invention.

The invention claimed is:

1. A method of providing a video in a portable terminal, the method comprising:
    monitoring whether an execution request event for a multi-camera mode of a portable terminal is generated;
    when the execution request event is generated, executing a virtual multi-preview menu including a plurality of preview regions, which is divided into independent separate regions and displays a plurality of different contents, respectively;
    when the virtual multi-preview menu is executed, recording the plurality of preview regions as a multi-preview image, so that the different contents are displayed on the plurality of preview regions, respectively, with a virtual camera implemented in the portable terminal,
    wherein the plurality of preview regions comprise:
        a left upper preview region displaying front video data provided from a front camera;
        a right upper preview region displaying rear video data provided from a rear camera;
        a left lower preview region reproducing an entire portion of video data pre-stored in a memory; and
        a right lower preview region reproducing animation data pre-stored in the memory;
    changing a point being played in the video data displayed in the left lower preview region or the animation data displayed in the right lower preview region by using a user interface; and
    transmitting multi-content data generated by matching an audio signal input from the outside and the multi-preview image to an additional service server or another portable terminal through a network in real time,
    wherein the content displayed on each preview region is individually rotated in any one direction among upper, lower, left, and right directions and a diagonal direction based on an inclination event of the portable terminal,
    wherein each preview region is individually zoomed in or zoomed out based on a zoom-in request event or a zoom-out request event.

2. The method of claim 1, wherein each operation for recording the plurality of preview regions is executed through an image providing application or a camera application mounted on the portable terminal.

3. The method of claim 1, wherein each preview region is added to or deleted from the virtual multi-preview menu based on a region addition event or a region deletion event.

4. The method of claim 1, wherein the virtual camera is a three-dimensional (3D) camera which photographs a 3D display of the multi-preview image.

5. A non-transitory computer readable recording medium stored in a computer program to cause a processor to perform a method of providing a video in a portable terminal, the method including:
    monitoring whether an execution request event for a multi-camera mode of a portable terminal is generated;
    when the execution request event is generated, executing a virtual multi-preview menu including a plurality of preview regions, which is divided into independent separate regions and displays a plurality of different contents, respectively;
    when the virtual multi-preview menu is executed, recording the plurality of preview regions as a multi-preview image, so that the different contents are displayed on the plurality of preview regions, respectively, with a virtual camera implemented in the portable terminal,
    wherein the plurality of preview regions comprise:
        a left upper preview region displaying front video data provided from a front camera;
        a right upper preview region displaying rear video data provided from a rear camera;
        a left lower preview region reproducing an entire portion of video data pre-stored in a memory; and
        a right lower preview region reproducing animation data pre-stored in the memory;
    changing a point being played in the video data displayed in the left lower preview region or the animation data displayed in the right lower preview region by using a user interface; and
    transmitting multi-content data generated by matching an audio signal input from the outside and the multi-preview image to an additional service server or another portable terminal through a network in real time,
    wherein the content displayed on each preview region is individually rotated in any one direction among upper, lower, left, and right directions and a diagonal direction based on an inclination event of the portable terminal,
    wherein each preview region is individually zoomed in or zoomed out based on a zoom-in request event or a zoom-out request event.

6. An apparatus for providing a video in a portable terminal, the apparatus comprising:
    an event detecting unit configured to monitor whether an execution request event for a multi-camera mode of a portable terminal is generated;
    a camera controlling unit configured to activate a front camera and a rear camera when the execution request event is generated;
    a preview menu executing unit configured to execute a virtual multi-preview menu including a plurality of preview regions, which is divided into independent separate regions and displays a plurality of different contents, respectively,
    a multi-image obtaining unit configured to photograph a multi-preview image so that the different contents are displayed on the plurality of preview regions, respectively, by using a virtual camera implemented in the portable terminal when the virtual multi-preview menu is executed;
    a content generating unit configured to generate multi-content data by inserting an audio signal into the multi-preview image and to record the multi-content data in a memory;
    a preview region switching unit configured to individually rotate the content displayed on each preview region in any one direction among upper, lower, left, and right directions and a diagonal direction based on an inclination event of the portable terminal; and a zoom executing unit configured to individually zoom in or zoom out each preview region based on a zoom-in request event or a zoom-out request event, wherein the plurality of preview regions comprise:
- a left upper preview region displaying front video data provided from a front camera;
- a right upper preview region displaying rear video data provided from a rear camera;
- a left lower preview region reproducing an entire portion of video data pre-stored in the memory; and
- a right lower preview region reproducing animation data pre-stored in the memory, wherein the multi-image obtaining unit changes a point being played in the video data displayed in the left lower preview region or the animation data displayed in the right lower preview region by using a user interface.

7. The apparatus of claim 6, wherein the content generating unit transmits the generated multi-content data to an additional service server or another portable terminal through a data transmitting and receiving unit in real time.

8. The apparatus of claim 6, further comprising:
a preview region managing unit configured to add or delete a preview region to or from the virtual multi-preview menu based on a region addition event or a region deletion event.

9. The apparatus of claim 6, wherein the virtual camera is a three-dimensional camera which photographs a 3D display of the multi-preview image.

* * * * *